US010933587B2

(12) United States Patent
Hicks et al.

(10) Patent No.: US 10,933,587 B2
(45) Date of Patent: Mar. 2, 2021

(54) REMOVING A PRINTED ITEM FROM A PRINTER

(71) Applicant: INTERNATIONAL BUSINESS MACHINES CORPORATION, Armonk, NY (US)

(72) Inventors: Andrew C. Hicks, Poughkeepsie, NY (US); Michael P. Lyons, Poughkeepsie, NY (US); Miles C. Pedrone, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 15/726,511

(22) Filed: Oct. 6, 2017

(65) Prior Publication Data

US 2019/0105838 A1    Apr. 11, 2019

(51) Int. Cl.
| | | |
|---|---|---|
| *B29C 64/379* | (2017.01) | |
| *B33Y 10/00* | (2015.01) | |
| *B29C 64/20* | (2017.01) | |
| *B29C 64/10* | (2017.01) | |
| *B33Y 30/00* | (2015.01) | |
| *B29C 64/245* | (2017.01) | |

(52) U.S. Cl.
CPC ............ *B29C 64/379* (2017.08); *B29C 64/10* (2017.08); *B29C 64/20* (2017.08); *B29C 64/245* (2017.08); *B33Y 10/00* (2014.12); *B33Y 30/00* (2014.12)

(58) Field of Classification Search
CPC ....... B29C 41/42; B29C 64/20; B29C 64/379; B33Y 30/00; B33Y 10/00; B23Q 3/00; G06F 19/00; B41J 23/00; B22F 3/00; B22F 3/087
See application file for complete search history.

(56) References Cited

U.S. PATENT DOCUMENTS 6,367,791 B1 *  4/2002  Calderon ............... B29C 48/05
                                              269/291
7,127,309 B2 * 10/2006  Dunn ..................... B29C 64/40
                                              700/98
(Continued)

FOREIGN PATENT DOCUMENTS

CN    104527071 A    4/2015
CN    204936227 U    1/2016
(Continued)

OTHER PUBLICATIONS

IBM, List of IBM Patents or Patent Applications Treated as Related, Appendix P, dated Dec. 20, 2017, 2 pages.

(Continued)

*Primary Examiner* — Matthew J Daniels
*Assistant Examiner* — Shibin Liang
(74) *Attorney, Agent, or Firm* — L. Jeffrey Kelly

(57) ABSTRACT

A method of removing a printed item from a 3D printer. The method may include loading a print bed into a 3D printer, where a bottom surface of the print bed may be removably attached to a print stage. The printed item may be printed by a tool head of the 3D printer atop the print bed. The print bed together with the printed item may be unloaded from the 3D printer upon completion of the printing, where unloading the print bed may include detaching the print bed from the print stage. The printed item may then be released from the print bed.

13 Claims, 3 Drawing Sheets

(56) References Cited

U.S. PATENT DOCUMENTS

| | | | |
|---|---|---|---|
| 9,289,946 B2* | 3/2016 | Perez | B29C 64/245 |
| 9,486,964 B2 | 11/2016 | Joyce | |
| 2007/0126157 A1* | 6/2007 | Bredt | B33Y 40/00 |
| | | | 264/334 |
| 2015/0056321 A1 | 2/2015 | Zhang et al. | |
| 2015/0273582 A1 | 10/2015 | Crump | |
| 2016/0059445 A1 | 3/2016 | Tummala et al. | |
| 2016/0243619 A1* | 8/2016 | Gothait | C09D 11/30 |
| 2016/0332387 A1 | 11/2016 | Jondal et al. | |
| 2017/0036403 A1* | 2/2017 | Ruff | B33Y 30/00 |
| 2017/0173889 A1* | 6/2017 | Thomas-Lepore | |
| | | | H04N 1/4433 |

FOREIGN PATENT DOCUMENTS

| | | | |
|---|---|---|---|
| CN | 205767544 U | 12/2016 | |
| KR | 1020160034554 A | 3/2016 | |
| KR | 1020160128657 A | 11/2016 | |

OTHER PUBLICATIONS

Pending U.S. Application 15/843,620, filed Dec. 15, 2017, entitled: "Removing a Printed Item From a Printer", 20 pages.

Doctorow, "3D Printing in Bulk with the Makerbot Automated Build Platform", Printed on Oct. 3, 2017, 4 Pages, https://boingboing.net/2010/09/13/3d-printing-in-bulk.html.

FBRC8, "Glass Print Bed", Printed on Oct. 3, 2017, 2 Pages, https://fbrc8.com/collections/ultimaker-original-spare-parts-1/products/print-table-glass.

FLEKS3D™, "Easier, Faster Better 3D Printing", Printed on Oct. 3, 2017, 7 Pages, https://www.fleks3d.com/read-me/.

Geckotek, "3D Printer Build Surfaces—Scientifically Formulated for Easy Printing and Removal", Printed on Oct. 3, 2017, 3 Pages, https://www.geckotek.co/.

Benchoff, "Automatic Print Ejectors for All 3D Printers", Hackaday, Jun. 6, 2015, Printed on Oct. 3, 2017, 8 Pages, https://hackaday.com/2015/06/06/automatic-print-ejector-for-all-3d-printers/.

Lulzbot, "PEI bed surface", Forum, Printed on Oct. 31, 2017, 6 Pages, https://forum.lulzbot.com/viewtopic.php?t=1019.

Thingiverse, "Automated Build Platform by MakerBot—Thingiverse", Sep. 13, 2010, Printed on Oct. 31, 2017, 5 Pages, https://www.thingiverse.com/thing:4056.

Buildtak, "BuildTak 3D Printing Surface", Printed on Oct. 3, 2017, 1 Page, https://www.buildtak.com/product/buildtak-3D-printing-surface/.

3D Universe, "3M ScotchBlue 2090 Painter's Tape, Super Wide 6-Inches by 60 Yards", Printed on Oct. 3, 2017, 7 Pages, https://shop3duniverse.com/collections/accessories/products/extra-wide-blue-tape.

Printinz, "PRINTinZ 3D Printer Plates", Printed on Oct. 3, 2017, 4 Pages, https://www/printinz.com/printinz-3d-printer-plates/.

* cited by examiner

REMOVING A PRINTED ITEM FROM A PRINTER

BACKGROUND

The present invention relates generally to the field of additive manufacturing, and more particularly to item or object removal methods in three-dimensional (3D) printers.

3D printing is a form of additive manufacturing. In some 3D printers, material is formed and deposited in layers on a print bed under computer control, or the like, to create 3D printed items or objects. It can be common for formed and deposited material to bond to a surface of the print bed. Once the 3D printed item is created, removal of the item from the 3D printer requires breaking the bonds between the material of the 3D printed item and the surface of the print bed.

SUMMARY

According to an aspect of the present invention, a method of removing a printed item from a 3D printer is provided. The method may include loading a print bed into a 3D printer, where a bottom surface of the print bed may be removably attached to a print stage. The printed item may be printed by a tool head of the 3D printer atop the print bed. The print bed together with the printed item may be unloaded from the 3D printer upon completion of the printing, where unloading the print bed may include detaching the print bed from the print stage. The printed item may then be released from the print bed.

BRIEF DESCRIPTION OF THE DRAWINGS

The following detailed description, given by way of example and not intended to limit the invention solely thereto, will best be appreciated in conjunction with the accompanying Figures. The Figures are not necessarily to scale. The Figures are merely schematic representations, not intended to portray specific parameters of the invention. The Figures are intended to depict only typical embodiments of the invention. In the Figures, like numbering represents like elements.

DETAILED DESCRIPTION

Figure 1:
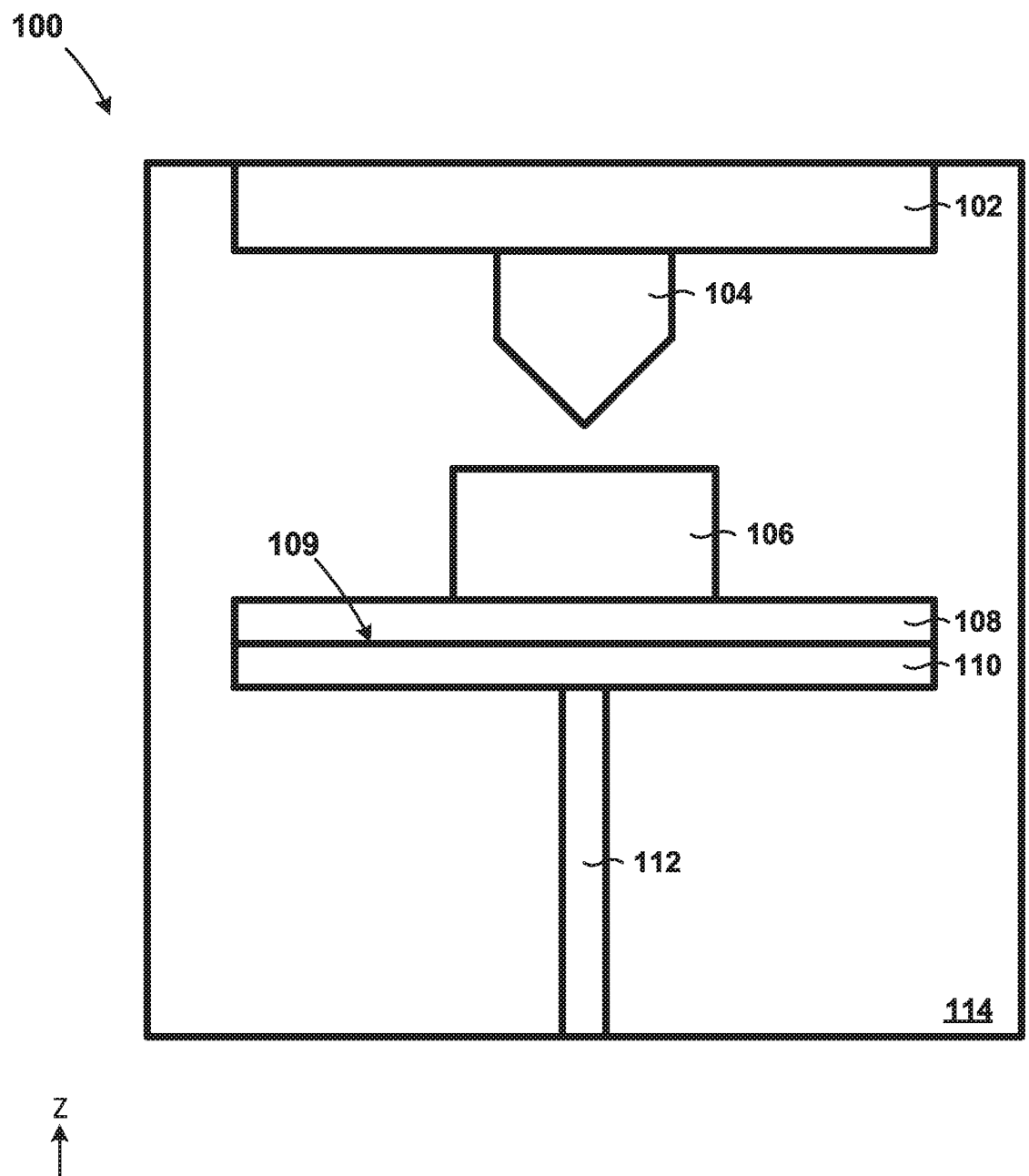
FIG. 1 depicts a cross-sectional view of a portion of a printer during an intermediate step of a method of printing, in accordance with an embodiment of the present invention.

Detailed embodiments of the present invention are disclosed herein for purposes of describing and illustrating claimed structures and methods that may be embodied in various forms, and are not intended to be exhaustive in any way, or limited to the disclosed embodiments. Many modifications and variations will be apparent to those of ordinary skill in the art without departing from the scope and spirit of the disclosed embodiments. The terminology used herein was chosen to best explain the principles of the one or more embodiments, the practical application or technical improvement over technologies found in the marketplace, or to enable others of ordinary skill in the art to understand the embodiments disclosed herein. As described, details of well-known features and techniques may be omitted to avoid unnecessarily obscuring the embodiments of the present invention.

References in the specification to "one embodiment", "an embodiment", "an example embodiment", or the like, indicate that the embodiment described may include one or more particular features, structures, or characteristics, but it shall be understood that such particular features, structures, or characteristics may or may not be common to each and every disclosed embodiment of the present invention herein. Moreover, such phrases do not necessarily refer to any one particular embodiment per se. As such, when one or more particular features, structures, or characteristics is described in connection with an embodiment, it is submitted that it is within the knowledge of those skilled in the art to effect such one or more features, structures, or characteristics in connection with other embodiments, where applicable, whether or not explicitly described.

For purposes of the description hereinafter, the terms "upper", "lower", "right", "left", "vertical", "horizontal", "top", "bottom", "perpendicular", "parallel", and the like, and any derivatives thereof, shall relate to the disclosed structures and methods, as oriented in the drawing figures. The terms "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary layers at the interface of the two elements.

In the interest of not obscuring disclosure of embodiments of the present invention, the following detailed description may contain certain processing steps or operations that are known in the art which may have been combined for purposes of clear description and illustration. In some instances, certain processing steps or operations that are known in the art may not be described in detail and/or may not be described at all. It shall be understood that the following disclosure of embodiments of the present invention is relatively focused on distinctive elements, features, structures, or characteristics thereof.

In removing a 3D printed item from a 3D printer, the 3D printed item is removed from a print bed of the 3D printer. Bonds formed between the 3D printed item and the print bed are commonly broken in removing the 3D printed item from the 3D printer. The breaking of bonds during the removal process can cause damage to the 3D printed item.

Embodiments of the present invention are directed to a method for removing a printed item from a printer. A print bed of the printer, upon which the printed item is printed, is removable from the printer upon completion of printing. The print bed is distortable to facilitate release and removal of the printed item from the print bed, while preserving the integrity of the printed item in the process. After the printed item is removed from the print bed, the print bed may subsequently be moved back into the printer for printing of another printed item.

Advantageously, the removable print bed according to the present disclosure facilitates careful removal of printed items from the print bed. To that end, embodiments of the present invention reduce the risk involved in removal of printed items from printers, particularly from 3D printers, thereby enhancing the efficiency and output of the printers and reducing the amount of waste caused by the discarding of printed items due to damage caused by the removal of the printed items from the printers.

FIG. 1 depicts a cross-sectional view of a portion of printer 100 during an intermediate step of a method of printing, in accordance with an embodiment of the present invention. Printer 100 may include tool stage 102 interconnected to tool head 104, print bed 108 interconnected to print stage 110, print stage 110 interconnected to stage support 112, and interior 114.

Printer 100 represents an automated manufacturing apparatus. In an embodiment of the present invention, printer 100 may be, for example, a 3D printer. In the embodiment, printer 100 may implement, for example, an additive manufacturing process such as fused filament fabrication in printing item 106. Item 106 may be a part, item, object, or the like, such as of a printed circuit board. Item 106 is printed on or along a surface of print bed 108. In the embodiment, printer 100 may implement, for example, a spatial orientation and positioning system that may include control systems, actuators, sensors, hardware, and the like, to spatially orient and position tool head 104 by way of tool stage 102, print bed 108 by way of print stage 110, or both, in printing item 106. Spatial orientation and positioning of tool head 104, print bed 108, or both, can occur along or about one or more of the X-, Y-, and Z-axes of a three-dimensional Cartesian coordinate system defined with respect to printer 100. Tool head 104 may be spatially arranged above print bed 108 within interior 114, as depicted in FIG. 1. For example, a closed loop control system can be implemented by printer 100 to actuate motors, such as DC stepper motors, to respectively orient and position tool head 104, print bed 108, or both, according to control data generated by encoders associated with the DC stepper motors. Printer 100 may include automated stereoscopic computer vision to monitor each printed layer during printing to ensure that an item such as item 106 prints correctly. Other spatial orientation and positioning systems can be used as a matter of design choice based on a particular application at-hand.

Tool stage 102 represents part of the spatial orientation and positioning system of printer 100 used to support and spatially orient and position tool head 104 in printing item 106. In an embodiment of the present invention, tool stage 102 may include, for example, a mount, carriage, chuck, or the like, to support and spatially orient and position one or more tool heads, such as tool head 104, within interior 114 of printer 100. In the embodiment, tool stage 102 may, for example, support tool head 104 for spatial orientation and positioning within interior 114 along or about one or more of the X-, Y-, and Z-axes of printer 100. In the embodiment, tool stage 102 may include, for example, a translational stage such as a one-, two-, three-, four-, five-, or six-axis stage, or the like. For example, tool stage 102 can be formed of two one-axis stages, connected to effect two-axis stage functionality in operation, and so on. In the embodiment, tool stage 102 may further include, for example, a linear bearing, rail, track, race, guide rod, or the like. For example, tool stage 102 can include a mount for receiving and supporting tool head 104, the mount being attached to one or more linear bearings, to effect spatial orientation and positioning of tool head 104 within interior 114 during operation of printer 100.

Tool head 104 represents an extruder of printer 100 used in printing item 106. In an embodiment of the present invention, tool head 104 may be, for example, an extruder, print head, or the like. In the embodiment, tool head 104 may implement, for example, an additive manufacturing process such as fused filament fabrication in printing item 106. During operation, tool head 104 receives or draws material, in the form of plastic or metallic filament, from a supply for heating, melting, and extruding of the drawn material from a nozzle of tool head 104. The extruded material is formed and deposited in layers on or along a surface of print bed 108 to form printed item 106. In the embodiment, the material may include, for example, plastic material such as acrylonitrile butadiene styrene (ABS), polylactic acid (PLA), high-impact polystyrene (HIPS), thermoplastic polyurethane (TPU), aliphatic polyamides (nylon), polypropylene (PP), polyetherimide (PEI), polyether ether ketone (PEEK), acrylonitrile styrene acrylate (ASA), polycarbonate (PC), polyethylene terephthalate (PET), polyoxymethylene (POM), polyvinyl alcohol (PVA), or the like. In the embodiment, the material may otherwise include wood fill material, metallic material, conductive material, or the like.

Print bed 108 represents a build surface used by printer 100 to deposit extruded material for support in printing item 106. In an embodiment of the present invention, print bed 108 may be or include, for example, a print bed, build plate, platform, table, board, sheet, laminate, or the like. A top surface of print bed 108 receives and supports extruded material deposited by tool head 104 in printing item 106. A size or surface area of print bed 108, such as with respect to the top surface, may be chosen according to a size of an item to be printed, such as item 106. In the embodiment, print bed 108 may be removably attached to print stage 110, such as at a bottom surface of print bed 108, along, across, or about a surface of print stage 110. The removable attachment may be located, for example, at interface 109, which may be positioned between a bottom surface of print bed 108 and a top surface of print stage 110, as depicted in FIG. 1.

Print stage 110 represents part of the spatial orientation and positioning system of printer 100 used to support and spatially orient and position print bed 108 in printing item 106. In an embodiment of the present invention, print stage 110 may include, for example, a platform, mount, carriage, chuck, or the like, to support and spatially orient and position one or more items, such as item 106, by way of print bed 108, within interior 114 of printer 100. In the embodiment, print stage 110 may, for example, support print bed 108 for spatial orientation and positioning within interior 114 along or about one or more of the X-, Y-, and Z-axes of printer 100. In the embodiment, print stage 110 may be or include, for example, a translational stage such as a one-, two-, three-, four-, five-, or six-axis stage, or the like. In the embodiment, interface 109 may include, for example, an actuator that may be implemented mechanically, electromechanically, magnetically, electromagnetically, pneumatically, or the like, to removably attach print bed 108 to print stage 110.

In an embodiment of the present invention, the mechanical implementation of the removable attachment may be formed, for example, along, across, or about interface 109. In the embodiment, the mechanical implementation may include, for example, mechanical fasteners such as clips, screws, bolts, hook and loop fasteners, or the like. In an example, clips can be fastened about a perimeter of one or both of print bed 108 and print stage 110, to implement the removable attachment about interface 109. In another example, bolts can be fastened along or across the bottom surface of print bed 108 and the top surface of print stage 110, to implement the removable attachment along or across interface 109.

In an embodiment of the present invention, the electromechanical implementation of the removable attachment may be formed, for example, along, across, or about interface 109. In the embodiment, the electromechanical implementation may include, for example, mechanically interlocking structures, such as catches or detents and corresponding retractable mating structures. For example, detents or catches and retractable mating structures, respectively formed in one or both of the bottom surfaces of print bed 108 and the top surface of print stage 110, can be actuated to implement the removable attachment.

In an embodiment of the present invention, the magnetic or electromagnetic implementation of the removable attachment may be formed, for example, along, across, or about interface 109. In the embodiment, the magnetic or electromagnetic implementation may include, for example, magnetic chucks, permanent magnets, electromagnets, or the like. In an example, electromagnets may be used to produce electromagnetic fields having components configured to induce corresponding applied electromagnetic forces, oriented with respect to print bed 108, print stage 110, or interface 109, to removably attach print bed 108 along, across, or about a surface of print stage 110, at interface 109. In the example, the applied electromagnetic forces may be oriented perpendicularly with respect to the bottom surface of print bed 108, the top surface of print stage 110, or the like. In the example, the magnetic chuck may be integrated or otherwise operable with print stage 110.

In an embodiment of the present invention, the pneumatic implementation of the removable attachment may be formed, for example, along or across interface 109. In the embodiment, the pneumatic implementation may include, for example, a vacuum chuck, or the like. In an example, a pneumatic chuck can be actuated to apply air pressure such as negative air pressure, a vacuum force, and the like, such as in the form of a vacuum or suction, to print bed 108 with respect to print stage 110 to implement the removable attachment along or across interface 109. In the example, the pneumatic chuck may be integrated or otherwise operable with print stage 110.

Additionally, other embodiments may use other types of forces to removably attach or temporarily affix print bed 108 to print stage 110 at interface 109, such as in the form of electrostatic forces, Van der Waals forces, or any other type of suitable forces.

Stage support 112 represents part of the spatial orientation and positioning system of printer 100 used to support and spatially orient and position print stage 110 in printing item 106. In an embodiment of the present invention, stage support 112 may be, for example, a robotic arm, or the like. In the embodiment, stage support 112 may include, for example, a platform, mount, carriage, chuck, end effector, or the like, to attach to, support and spatially orient and position one or more print stages, such as print stage 110, within or inside, outside, and about interior 114 of printer 100. The robotic arm may include stereoscopic computer vision. In the embodiment, stage support 112 may, for example, support print bed 108 by way of print stage 110 for spatial orientation and positioning within, outside, and about interior 114 along or about one or more of the X-, Y-, and Z-axes of printer 100. In the embodiment, upon completion of printing, stage support 112 may move print stage 110 together with print bed 108 and item 106 outside of interior 114, for detachment of print bed 108, together with item 106, from print stage 110. In the embodiment, print bed 108 may subsequently be removably reattached to print stage 110 after removal of item 106 from print bed 108, to reenter interior 114 for printing of another item, such as item 106. In the embodiment, after the detachment of print bed 108 from print stage 110, another print bed, such as print bed 108, may otherwise be attached to print stage 110 to enter interior 114 for printing of another item, such as item 106.

In an embodiment of the present invention, stage support 112 may be, for example, a conveyor belt, or the like. In the embodiment, stage support 112 may include or otherwise be attached to, for example, a series of print stages such as print stage 110, in the form of platforms, mounts, carriages, chucks, or the like. In the embodiment, stage support 112 may otherwise include, for example, one continuous print stage such as print stage 110, in the form of a flexible track or platform, to support the series of print beds such as print bed 108. In the embodiment, stage support 112 may, for example, support print bed 108 by way of print stage 110, for spatial orientation and positioning within, outside, and about interior 114 along or about one or more of the X-, Y-, and Z-axes of printer 100. In the embodiment, upon completion of printing, stage support 112 may move print stage 110 together with print bed 108 and item 106 outside of interior 114, for detachment of print bed 108, together with item 106, from print stage 110. In the embodiment, print bed 108 may subsequently be removably reattached to print stage 110 after removal of item 106 from print bed 108, to reenter interior 114 for printing of another item, such as item 106. In the embodiment, after the detachment of print bed 108 from print stage 110, another print bed similar to print bed 108 may otherwise be attached to print stage 110 to enter interior 114 for printing of another item, such as item 106. In the embodiment, the detachment of item 106 from print bed 108 may be effected, for example, by removal tool such as a wedge or fine edged tool. In the embodiment, the wedge or fine edged tool may be, for example, positioned to physically intervene between item 106 and print bed 108, to remove item 106 from print bed 108. Item 106 can subsequently be deposited in a receptacle, or the like. In the embodiment, stage support 112 may concurrently move another print stage, such as print stage 110, together with another print bed, such as print bed 108, inside of interior 114 for printing of another item, such as item 106.

Figure 2:
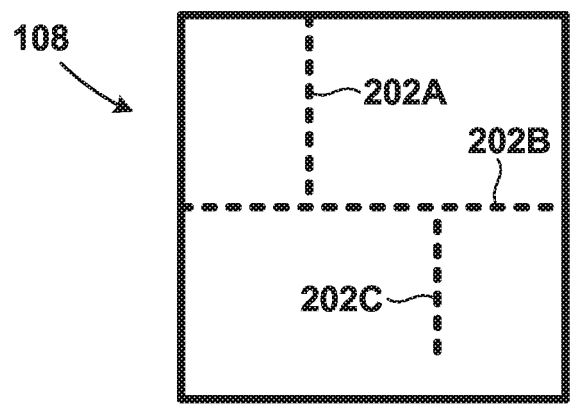
FIG. 2 depicts a top view of a print bed, in accordance with an embodiment of the present invention.

FIG. 2 depicts a top view of print bed 108, in accordance with an embodiment of the present invention. Print bed 108 may include flex axes 202A-C.

Print bed 108 represents a build surface used by printer 100 to deposit extruded material for support in printing item 106, as described with reference to FIG. 1. In an embodiment of the present invention, print bed 108 may include, for example, one or more bending or flex axes 202A-C. In the embodiment, each of flex axes 202A-C may define, for example, an axis or one or more points about which flexing of print bed 108 may occur, to facilitate removal of item 106. In the embodiment, the flexing of print bed 108 may include, for example, distorting or deforming the print bed 108. The flexing can be effected by torque or a torsional force applied to print bed 108, about one or more of flex axes 202A-C, respectively. In the embodiment, flex axes 202A-C may be formed and implemented by, for example, incisions, scores, cuts, or the like. In the embodiment, various depths of one or more of the incisions, various cross-sectional or incision profiles of one or more of the incisions, various lengths of one or more of the incisions, or the like, may be implemented to effect various flexural moduli of print bed 108, with respect to each of flex axes 202A-C, respectively. In the embodiment, one or more of the incisions may extend completely or partially through print bed 108. In the embodiment, localized variations in material, in material properties, or the like, may otherwise be used to effect various flexural moduli of print bed 108, with respect to each of flex axes 202A-C, respectively. As depicted in FIG. 2, flex axis 202B may extend from edge to edge across print bed 108, and flex axes 202A and 202C may extend from an edge across a portion of print bed 108. In the embodiment, one or more of flex axes 202A-C may respectively extend entirely across print bed 108 from edge to edge. In the embodiment, one or more of flex axes 202A-C may, either alternatively or otherwise, respectively extend partially across print bed 108 from an edge to a point positioned along a face of print bed 108. In the embodiment, one or more of flex axes 202A-C may, either alternatively or otherwise, respectively extend partially across print bed 108 from two or more points positioned along a face of print bed 108. Particular orientations, positions, characteristics, and the like, of each of flex axes 202A-C may be chosen as a matter of design choice.

Figure 3:
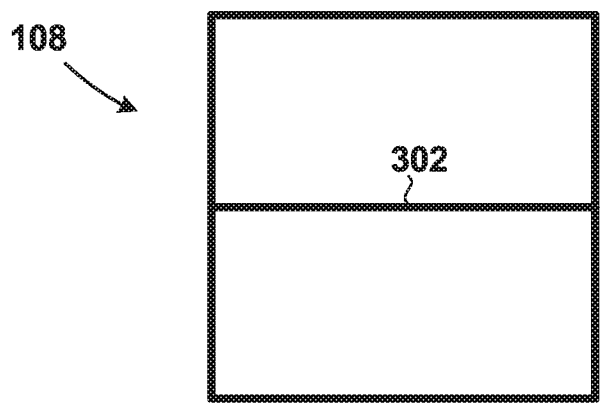
FIG. 3 depicts a top view of a print bed, in accordance with an embodiment of the present invention.

FIG. 3 depicts a top view of print bed 108, in accordance with an embodiment of the present invention. Print bed 108 may include jointed axis 302.

Print bed 108 represents a build surface used by printer 100 to deposit extruded material for support in printing item 106, as described with reference to FIG. 1. In an embodiment of the present invention, print bed 108 may include, for example, one or more of jointed axis 302. In the embodiment, jointed axis 302 may be, for example, a hinge, a ratcheted hinge, or the like. In the embodiment, jointed axis 302 may be, for example, selectively rotatable, or the like. In the embodiment, rotating jointed axis 302 may cause, for example, print bed 108 to distort or deform, accordingly. In the embodiment, print bed 108 may include, for example, corresponding segments joined by jointed axis 302. In the embodiment, jointed axis 302 may define, for example, an axis of rotation about which the corresponding sections or segments of print bed 108 may rotate, to facilitate release and removal of item 106 from print bed 108. Rotation of the corresponding segments of print bed 108 reduces an effective surface area of attachment of item 106 to print bed 108, thereby facilitating the release and removal of item 106. For example, in printing item 106, jointed axis 302 can be locked to prevent relative rotation of the corresponding segments of print bed 108, and upon completion of printing, can be unlocked to allow relative rotation of the corresponding segments to facilitate removal of item 106 from print bed 108. Particular orientations, positions, characteristics, and the like, of jointed axis 302 may be chosen as a matter of design choice.

Figure 4:
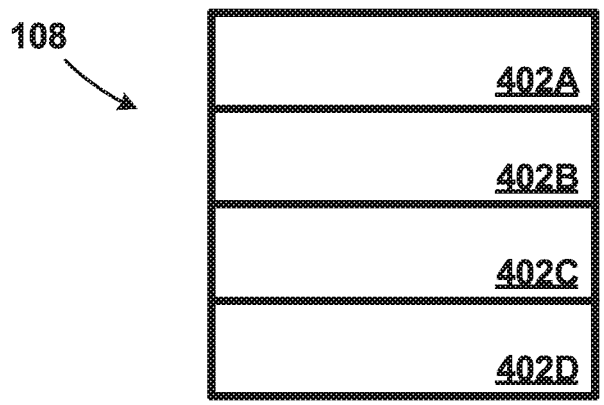
FIG. 4 depicts a top view of a print bed, in accordance with an embodiment of the present invention.

FIG. 4 depicts a top view of print bed 108, in accordance with an embodiment of the present invention. Print bed 108 may include modular print bed sections 402A-D.

Print bed 108 represents a build surface used by printer 100 to deposit extruded material for support in printing item 106, as described with reference to FIG. 1. In an embodiment of the present invention, print bed 108 may include, for example, one or more modular print bed sections 402A-D. In the embodiment, each of print bed sections 402A-D may define and form, for example, individually removable sections of print bed 108 that may be detached from one another to facilitate removal of item 106 from print bed 108. In the embodiment, removing each of print bed sections 402A-D may cause, for example, print bed 108 to distort or deform, accordingly. In the embodiment, print bed 108 may include, for example, an underlying layer to which each of modular print bed sections 402A-D may removably attach. In the embodiment, the removable attachment of print bed sections 402A-D to the underlying layer may be implemented, for example, by magnets, mechanically interlocking structures, or the like. In the embodiment, print bed 108 together with the underlying layer and the modular print bed sections 402A-D may be used in receiving and supporting extruded material deposited by tool head 104 in printing item 106. In the embodiment, print bed 108 together with the underlying layer and the modular print bed sections 402A-D may be removed from interior 114 of printer 100 upon completion of printing, for removal of item 106 from print bed 108. Item 106 is removed from print bed 108 by removing individual modular print bed sections 402A-D, thereby facilitating release of item 106 from print bed 108.

Figure 5:
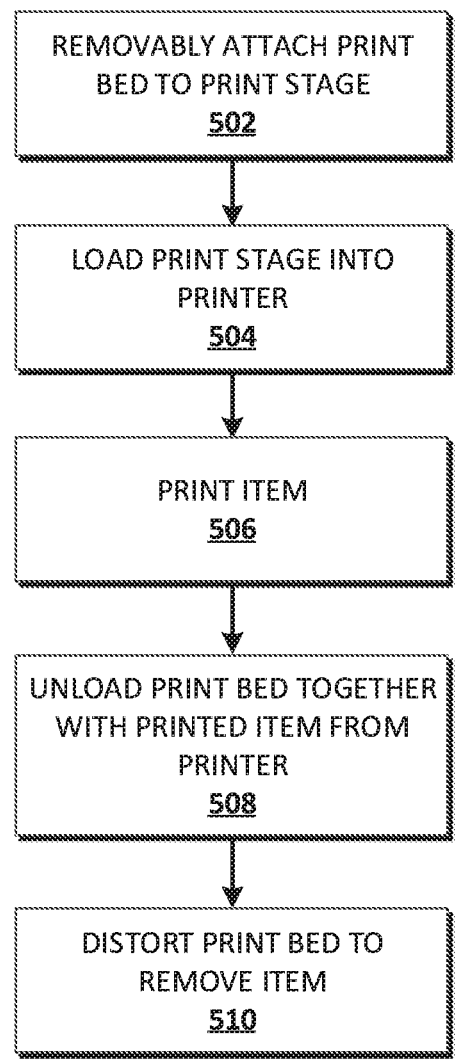
FIG. 5 is a flowchart depicting operational steps of a printer during an intermediate step of a method of printing, in accordance with an embodiment of the present invention.

FIG. 5 is a flowchart depicting operational steps of printer 100 during an intermediate step of a method of printing, in accordance with an embodiment of the present invention.

At step 502, print bed 108 is removably attached at a bottom surface thereof to a surface of print stage 110, such as at interface 109. In an embodiment of the present invention, the removable attachment of print bed 108 to print stage 110 may be implemented, for example, at interface 109 mechanically, electromechanically, magnetically, electromagnetically, or pneumatically, as previously described. As may be appreciated by those of skill in the art, print bed 108 may otherwise be removably attached to print stage 110 by one or more surfaces or facets thereof, which may be chosen as a matter of design.

At step 504, print stage 110 and print bed 108 are loaded into printer 100 by way of stage support 112. In an embodiment of the present invention, stage support 112 may be, for example, a robotic arm, a conveyor belt, or the like, as previously described.

At step 506, item 106 is printed or created by tool head 104 on or along a top surface of print bed 108, as previously described and depicted in FIG. 1.

At step 508, upon completion of printing of item 106, print bed 108 together with item 106 is unloaded from printer 100. In an embodiment of the present invention, print bed 108 together with item 106 may be unloaded from printer 100, for example, by detaching print bed 108 from print stage 110, such as at interface 109 as previously described, while each are positioned within interior 114 of printer 100, and then manually removing, such as by hand, print bed 108 together with item 106 from within interior 114. In the embodiment, print bed 108 together with item 106 may otherwise be unloaded from printer 100, for example, by moving print stage 110 together with print bed 108 and item 106 to a position outside or about interior 114, by way of stage support 112, as previously described, and then detaching print bed 108 from print stage 110, such as at interface 109 as previously described. Mechanical actuation, electromechanical actuation, magnetic actuation, electromagnetic actuation, pneumatic actuation, or the like, may be used in effecting the detachment, as previously described.

At step 510, the top surface of print bed 108 is distorted to release item 106 therefrom. In an embodiment of the present invention, the distortion of print bed 108 may be effected, for example, by way of an applied torque to print bed 108. The applied torque may be implemented, for example, mechanically. In the embodiment, the distortion of print bed 108 may be otherwise be effected, for example, by way of a piezoelectric effect implemented with respect to print bed 108, to cause the distortion. As may be appreciated by those of skill in the art, print bed 108 may otherwise be distorted in a manner chosen as a matter of design choice.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein. It is therefore intended that the present invention not be limited to the exact forms and details described and illustrated but fall within the scope of the appended claims.

What is claimed is:

1. A 3D printer comprising:
    a tool head located within a 3D printer compartment;
    a movable print stage, wherein the movable print stage is movable between an interior and exterior of the 3D printer; and
    a print bed removably attached to the print stage, wherein the print bed is removably attached to the print stage by mechanical interlocking structures comprising one or more retractable catches on a lower horizontal surface of the print bed and comprising one or more detents on the lower horizontal surface of the print bed,
    wherein the print stage comprises corresponding one or more retractable mating catches on an upper horizontal surface of the print stage and comprises corresponding one or more detents on the upper horizontal surface of the print stage,
    such that the print bed and the print stage can each be electromechanically actuated to implement the retractable catches and detents on the lower horizontal surface of the print bed and the retractable catches and detents on the upper horizontal surface of the print stage.

2. The 3D printer of claim 1, wherein the print bed is removably attached to the print stage by one or more selected from the group consisting of: an electromechanical actuator, a permanent magnet, an electromagnetic actuator, and a pneumatic actuator.

3. The 3D printer of claim 1, further comprising:
    a stage support which supports the print stage comprises one selected from a group consisting of a robotic arm having an end effector, and a conveyor belt.

4. The 3D printer of claim 1, wherein the print bed comprises one or more bending axes.

5. The 3D printer of claim 4, wherein the one or more bending axes comprise at least one feature selected from a group consisting of variation in material, variation in material properties, and a hinge.

6. A 3D printer comprising:
    a print bed removably attached to a print stage, wherein the print bed is removably attached to the print stage by mechanical interlocking structures comprising one or more retractable catches on a lower horizontal surface of the print bed and comprising one or more detents on the lower horizontal surface of the print bed,
    wherein the print stage comprises corresponding one or more retractable mating retractable catches and comprises corresponding one or more detents on an upper horizontal surface of the print stage on the upper horizontal surface of the print stage, such that the print stage can be pneumatically actuated to implement the retractable catches and detents on the lower horizontal surface of the print bed and the retractable catches and detents on the upper horizontal surface of the print stage.

7. A 3D printer comprising:
    a print bed removably attached to a print stage, wherein the print bed is removably attached to the print stage by retractable mechanical interlocking structures comprising one or more catches on a lower horizontal surface of the print bed and comprising one or more detents on the lower horizontal surface of the print bed,
    wherein the print stage comprises corresponding one or more mating catches and on an upper horizontal surface of the print stage and comprises corresponding one or more detents on the upper horizontal surface of the print stage, such that the print stage can be pneumatically actuated to implement the removable attachment.

8. The 3D printer of claim 6, further comprising:
    a stage support which supports the print stage comprising one selected from a group consisting of a robotic arm having an end effector, and a conveyor belt.

9. The 3D printer of claim 6, wherein the print bed comprises one or more bending axes.

10. The 3D printer of claim 9, wherein the one or more bending axes comprise at least one feature selected from a group consisting of variation in material, variation in material properties, and a hinge.

11. The 3D printer of claim 7, further comprising:
    a stage support which supports the print stage comprising one selected from a group consisting of a robotic arm having an end effector, and a conveyor belt.

12. The 3D printer of claim 7, wherein the print bed comprises one or more bending axes.

13. The 3D printer of claim 12, wherein the bending axes comprise at least one feature selected from a group consisting of variation in material, variation in material properties, and a hinge.

* * * * *